(12) United States Patent
Kliewer et al.

(10) Patent No.: US 12,277,229 B2
(45) Date of Patent: Apr. 15, 2025

(54) PRE-CALCULATION OF CRYPTOPROCESSOR CONTROL REGISTER

(71) Applicant: Forcepoint Federal Holdings LLC, Austin, TX (US)

(72) Inventors: Robert Kliewer, Wylie, TX (US); Darrel Goeddel, Urbana, IL (US); Ted Pacyga, St. Louis, MO (US)

(73) Assignee: EVERFOX HOLDINGS LLC, Herndon, VA (US)

( * ) Notice: Subject to any disclaimer, the term of this patent is extended or adjusted under 35 U.S.C. 154(b) by 84 days.

(21) Appl. No.: 18/452,024

(22) Filed: Aug. 18, 2023

(65) Prior Publication Data

US 2025/0061205 A1    Feb. 20, 2025

(51) Int. Cl.
*G06F 21/57* (2013.01)
(52) U.S. Cl.
CPC .................................. *G06F 21/575* (2013.01)
(58) Field of Classification Search
CPC ...................................................... G06F 21/575
See application file for complete search history.

(56) References Cited

U.S. PATENT DOCUMENTS

| | | | | |
|---|---|---|---|---|
| 2002/0194389 | A1* | 12/2002 | Worley, Jr. | G06F 9/4812 719/310 |
| 2003/0115445 | A1* | 6/2003 | Heller | G06F 9/4484 712/E9.082 |
| 2018/0365422 | A1* | 12/2018 | Callaghan | H04L 63/0435 |
| 2023/0252172 | A1* | 8/2023 | Mink | G06F 21/72 726/26 |
| 2023/0261866 | A1* | 8/2023 | Roper | G06F 21/80 713/2 |
| 2024/0086543 | A1* | 3/2024 | Hwang | H04L 9/3247 |

* cited by examiner

*Primary Examiner* — Zahid Choudhury
(74) *Attorney, Agent, or Firm* — Jackson Walker L.L.P.

(57) ABSTRACT

A computer-implementable method may include, during execution of an installation image for installing an operating system on an information handling system performing mock measurements for one or more configuration registers of a cryptoprocessor of the information handling system based on values for the one or more configuration registers that will exist for a boot session of the information handling system immediately following installation of the operating system, extending the mock measurements into the one or more mock configuration registers, and storing an encryption key to the cryptoprocessor such that the encryption key is accessible to a subsequent boot session of the information handling system if the contents of the one or more configuration registers are equal to measurements performed by firmware of the information handling system during the subsequent boot session.

15 Claims, 2 Drawing Sheets

PRE-CALCULATION OF CRYPTOPROCESSOR CONTROL REGISTER

FIELD OF DISCLOSURE

The present invention relates in general to the field of computers and similar technologies, and in particular to software utilized in this field. Still more particularly, it relates to a method, system, and computer-usable medium for pre-calculation of a cryptoprocessor control register for use on a subsequent boot session of an information handling system, for example in connection with storage of disk encryption keys during for installation of an operating system.

BACKGROUND

A cryptoprocessor, such as a Trusted Platform Module (TPM), may be used in an information handling system to securely store secrets, such as encryption keys. Such secrets may be stored in a cryptoprocessor in such a way as to only be accessible if the information handling system is measured by the cryptoprocessor to have booted in a certain secure manner.

To illustrate, during a normal Unified Extensible Firmware Interface (UEFI) boot of an information handling system, firmware (e.g., basic input/output system (BIOS)) of the information handling system may perform measurements associated with the boot process and place those measurements into one or more configuration registers of a cryptoprocessor (e.g., Platform Configuration Registers (PCRs) of a TPM). Such measurements may comprise performing a cryptographic hash of a relevant piece of data associated with a boot process and extending the hash into the appropriate configuration register. To extend a configuration register measurement, a current value and new value of the measurement may be concatenated and hashed. Thus, by the time a user interacts with an information handling system, either through a BIOS menu or the operating system of the information handling system, configuration registers are already measured.

For purposes of storage of an encryption key, such as a disk encryption key for encrypting data written to storage media, an operating system may use hashes stored in one or more configuration registers. For example, with a TPM, an operating system may use PCR 0, relating to BIOS and Core Root of Trust, and PCR 7, relating to Secure Boot performed by BIOS, for storing encryption keys. Some operating system vendors may use custom Secure Boot values and not typical defaults. As a result, only operating system vendor-approved software (by signature or by hash) may boot on the information handling system. Additionally, other signature checking may occur beyond the UEFI stage of boot to ensure only the vendor's restricted operating system may boot. In other words, if Secure Boot was enabled and the operating system was able to boot, then it can be assured that the secure operating system is executing.

Prior to the installation of certain secure operating systems, Secure Boot values must be cleared from the BIOS menu, putting the information handling system in a BIOS Setup Mode. The next step may be to install the appropriate Secure Boot values and then reboot the information handling system to install the secure operating system, to ensure that the PCR 7 measurement at install time matches the value it will have on subsequent boot sessions. However, a trusted operating system may be installed over a network on a single boot. An administrator may perform the installation, but a non-privileged user may operate the information handling system after installation. In cases with only one boot cycle for installation, the Secure Boot keys must be updated at the same time as installation of the operating system. Thus, a problem arises in that there is a need to store the encryption key (created at install time) using a PCR 7 value that does not exist for the current system boot.

SUMMARY

In accordance with the teachings of the present disclosure, certain disadvantages and problems associated with existing approaches to making and using encrypted installation media for operating systems have been reduced or eliminated.

In accordance with embodiments of the present disclosure, a computer-implementable method may include, during execution of an installation image for installing an operating system on an information handling system performing mock measurements for one or more configuration registers of a cryptoprocessor of the information handling system based on values for the one or more configuration registers that will exist for a boot session of the information handling system immediately following installation of the operating system, extending the mock measurements into the one or more mock configuration registers, and storing an encryption key to the cryptoprocessor such that the encryption key is accessible to a subsequent boot session of the information handling system if the contents of the one or more configuration registers are equal to measurements performed by firmware of the information handling system during the subsequent boot session.

In accordance with these and other embodiments of the present disclosure, a system may include a processor and a non-transitory, computer-readable storage medium embodying computer program code, the non-transitory, computer-readable storage medium being coupled to the data bus, the computer program code interacting with a plurality of computer operations and comprising instructions executable by the processor and configured for, when read and executed by the processor: performing mock measurements for one or more configuration registers of a cryptoprocessor of the information handling system based on values for the one or more configuration registers that will exist for a boot session of the information handling system immediately following installation of the operating system; extending the mock measurements into the one or more mock configuration registers; and storing an encryption key to the cryptoprocessor such that the encryption key is accessible to a subsequent boot session of the information handling system if the contents of the one or more configuration registers are equal to measurements performed by firmware of the information handling system during the subsequent boot session.

In accordance with these and other embodiments of the present disclosure, a non-transitory, computer-readable storage medium may embody computer program code, the computer program code comprising computer executable instructions configured for: performing mock measurements for one or more configuration registers of a cryptoprocessor of an information handling system based on values for the one or more configuration registers that will exist for a boot session of the information handling system immediately following installation of the operating system; extending the mock measurements into the one or more mock configuration registers; and storing an encryption key to the cryptoprocessor such that the encryption key is accessible to a subsequent boot session of the information handling system if the contents of the one or more configuration registers are equal to measurements performed by firmware of the information handling system during the subsequent boot session.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
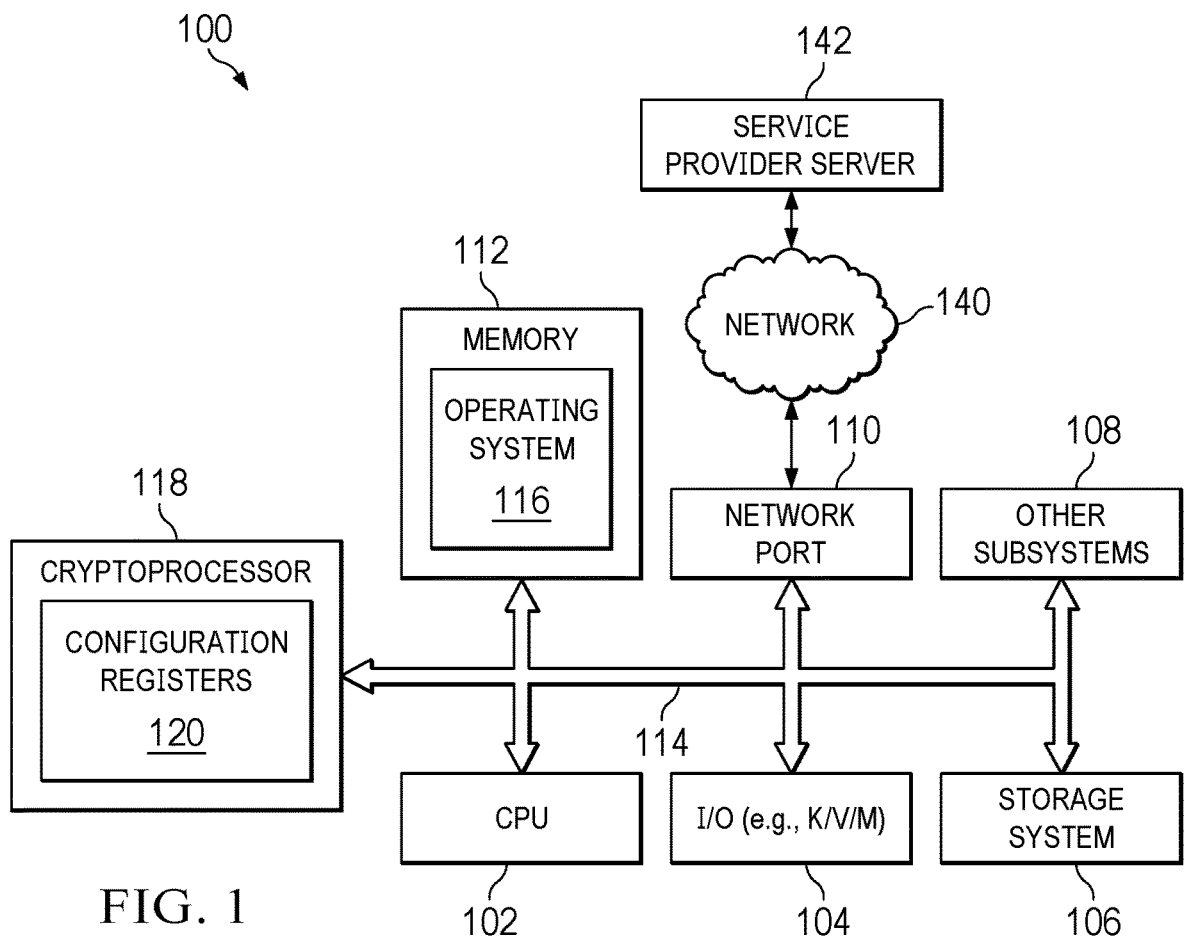
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may further include a cryptoprocessor 118, which may be coupled to the foregoing via one or more buses 114. Information handling system 100 may also include system memory 112, which may be coupled to the foregoing via one or more buses 114. System memory 112 may store operating system (OS) 116. In some embodiments, information handling system 100 may be able to install operating system 116 via service provider server 142. In other embodiments, an installation image for operating system 116 may be provided as a service from the service provider server 142.

Cryptoprocessor 118 may be communicatively coupled to CPU 102 and may include any system, device, or apparatus configured to carry out cryptographic operations on data communicated to it from CPU 102 and/or another component of information handling system 100. In some embodiments, cryptoprocessor 118 may be compliant with the Trusted Platform Module (TPM) specification, a successor specification, and/or any other similar specification. In some embodiments, cryptoprocessor 116 may be configured to generate random numbers, generate encryption keys (e.g., RSA keys), generate and maintain hash key tables of hardware and software components of information handling system 100, generate and maintain configuration parameters associated with hardware and software components of information handling system 100, wrap (e.g., encrypt) keys, unwrap (e.g., decrypt) keys and/or store keys (e.g., endorsement key, storage root key, attestation identity keys, storage keys).

As shown in FIG. 1, cryptoprocessor 118 may include configuration registers 120. In some embodiments, configuration registers 120 may include platform configuration registers (PCRs) compliant with the Trusted Platform Module specification, a successor specification, and/or any other similar specification. Configuration registers 120 may be used to securely store any relevant information, including without limitation secure storage relating to measurements of a configuration of information handling system 100 and its components, for use in creating a secure chain of trust.

Figure 2:
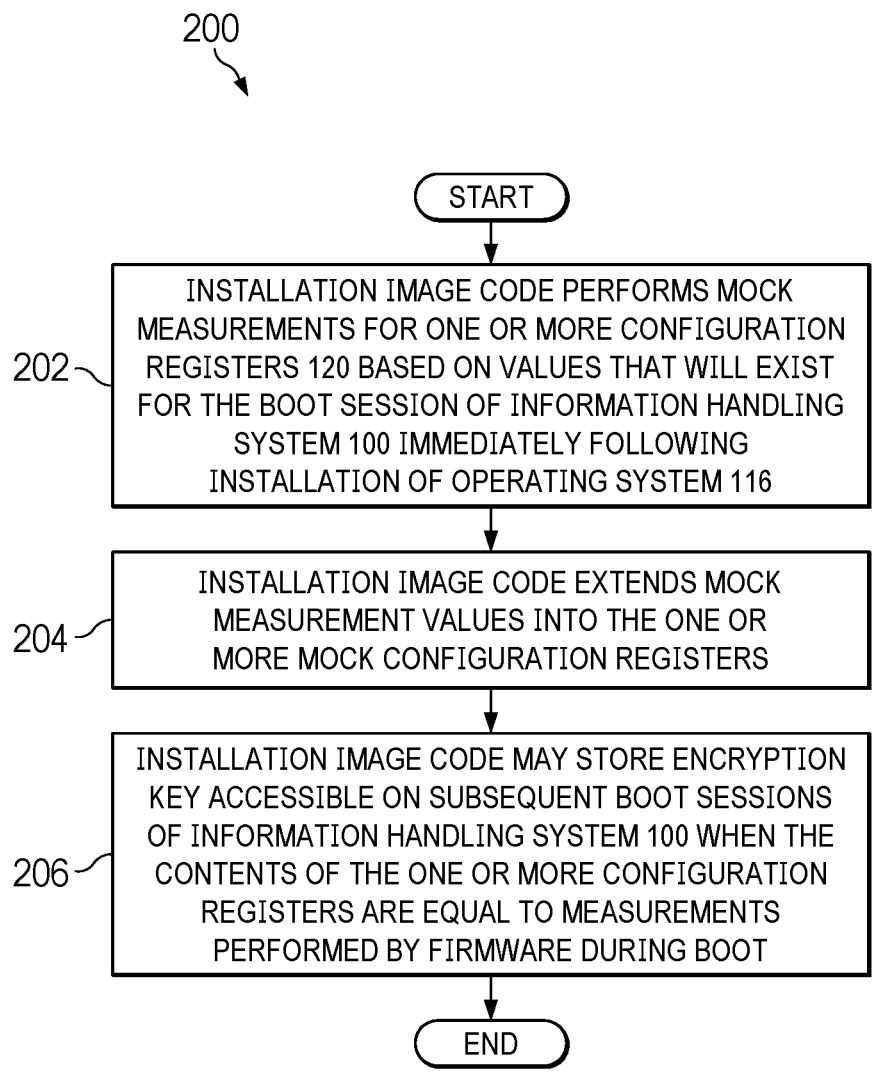
FIG. 2 illustrates a flow chart of an example method for pre-calculation of cryptoprocessor control registers for a subsequent boot session during installation of an operating system, in accordance with embodiments of the present disclosure.

FIG. 2 illustrates a flow chart of an example method 200 for pre-calculation of cryptoprocessor control registers for a subsequent boot session during installation of an operating system, in accordance with embodiments of the present disclosure. According to some embodiments, method 200 may begin at step 202. As noted above, teachings of the present disclosure may be implemented in a variety of configurations of information handling system 100. As such, the preferred initialization point for method 200 and the order of the steps comprising method 200 may depend on the implementation chosen. Method 200 may execute during and as part of execution of installation image for installing operating system 116 on information handling system 100.

At step 202, the installation image code may perform mock measurements for one or more configuration registers 120 (e.g., measurements for Secure Boot and TPM PCR 7) based on values that will exist for the boot session of information handling system 100 immediately following installation of operating system 116. Accordingly, the installation image code may replicate the data structures used by (and only available in) UEFI firmware in order to make the mock measurements. As part of the mock measurements, certificates for the vendor of operating system 116, approved hash lists, and certain fixed Boolean values may be measured. At step 204, the installation image code may extend such measurement values into the one or more mock configuration registers (e.g., implemented in system memory). These items may mirror the values that are set in the Secure Boot variables so that the mock configuration register measurement is identical to the firmware configuration register measurement on next boot.

At step 206, once the mock configuration register measurement is calculated and extended, the installation image code may store an encryption key (e.g., for a hard disk drive of storage system 106) to cryptoprocessor 118, which may only be accessible on subsequent boot sessions of information handling system 100 when the contents of one or more configuration registers (e.g., TPM PCRs 0 and 7) are equal to measurements performed by firmware (e.g., BIOS) during boot. Accordingly, while the stored encryption key may not be read-accessible for the current boot of the installation procedure, it may be read-accessible for subsequent boot cycles.

After completion of step 206, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using CPU 102 and/or any other system operable to implement method 200. In some embodiments, method 200 may be implemented partially or fully in software and/or firmware embodied in computer-readable media. For example, in some embodiments, method 200 may be implemented from a program of instructions stored on computer-readable media accessible via network 140, I/O devices 104, and/or storage system 106.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implementable method comprising, during execution of an installation image for installing an operating system on an information handling system:
    performing mock measurements for one or more configuration registers of a cryptoprocessor of the information handling system based on values for the one or more configuration registers that will exist for a boot session of the information handling system immediately following installation of the operating system;
    extending the mock measurements into one or more mock configuration registers; and
    storing an encryption key to the cryptoprocessor such that the encryption key is accessible to a subsequent boot session of the information handling system if the contents of the one or more mock configuration registers are equal to measurements performed by firmware of the information handling system during the subsequent boot session.

2. The computer-implementable method of claim 1, wherein the cryptoprocessor comprises a Trusted Platform Module.

3. The computer-implementable method of claim 2, wherein the one or more configuration registers comprise one or more Platform Configuration Registers of the Trusted Platform Module.

4. The computer-implementable method of claim 1, wherein the one or more configuration registers comprise a Platform Configuration Register associated with a secure boot assurance executed by a basic input/output system of the information handling system.

5. The computer-implementable method of claim 1, wherein the encryption key is used in connection with encryption or decryption of data stored to a hard disk drive of the information handling system.

6. A system comprising:
    a processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for, when read and executed by the processor:
        performing mock measurements for one or more configuration registers of a cryptoprocessor of the information handling system based on values for one or more configuration registers that will exist for a boot session of the information handling system immediately following installation of the operating system;
        extending the mock measurements into one or more mock configuration registers; and
        storing an encryption key to the cryptoprocessor such that the encryption key is accessible to a subsequent boot session of the information handling system if the contents of the one or more mock configuration registers are equal to measurements performed by firmware of the information handling system during the subsequent boot session.

7. The system of claim 6, wherein the cryptoprocessor comprises a Trusted Platform Module.

8. The system of claim 7, wherein the one or more configuration registers comprise one or more Platform Configuration Registers of the Trusted Platform Module.

9. The system of claim 6, wherein the one or more configuration registers comprise a Platform Configuration Register associated with a secure boot assurance executed by a basic input/output system of the information handling system.

10. The system of claim 6, wherein the encryption key is used in connection with encryption or decryption of data stored to a hard disk drive of the information handling system.

11. A non-transitory, computer-readable storage medium embodying computer program code, the computer program code comprising computer executable instructions configured for:

performing mock measurements for one or more configuration registers of a cryptoprocessor of an information handling system based on values for the one or more configuration registers that will exist for a boot session of the information handling system immediately following installation of the operating system;

extending the mock measurements into one or more mock configuration registers; and storing an encryption key to the cryptoprocessor such that the encryption key is accessible to a subsequent boot session of the information handling system if the contents of the one or more mock configuration registers are equal to measurements performed by firmware of the information handling system during the subsequent boot session.

12. The storage medium of claim 11, wherein the cryptoprocessor comprises a Trusted Platform Module.

13. The storage medium of claim 12, wherein the one or more configuration registers comprise one or more Platform Configuration Registers of the Trusted Platform Module.

14. The storage medium of claim 11, wherein the one or more configuration registers comprise a Platform Configuration Register associated with a secure boot assurance executed by a basic input/output system of the information handling system.

15. The storage medium of claim 11, wherein the encryption key is used in connection with encryption or decryption of data stored to a hard disk drive of the information handling system.

* * * * *